United States Patent
Sykora

(10) Patent No.: US 7,063,207 B2
(45) Date of Patent: Jun. 20, 2006

(54) LONG WEAR CONVEYOR ASSEMBLY

(75) Inventor: Frank B. Sykora, Caledon (CA)

(73) Assignee: Greylock, Inc., Sedona, AZ (US)

( * ) Notice: Subject to any disclaimer, the term of this patent is extended or adjusted under 35 U.S.C. 154(b) by 0 days.

(21) Appl. No.: 11/065,250

(22) Filed: Feb. 24, 2005

(65) Prior Publication Data

US 2005/0139455 A1  Jun. 30, 2005

Related U.S. Application Data

(62) Division of application No. 10/694,064, filed on Oct. 27, 2003, now abandoned, which is a division of application No. 09/923,985, filed on Aug. 7, 2001, now Pat. No. 6,666,328.

(51) Int. Cl.
  *B65G 17/06* (2006.01)
(52) U.S. Cl. ............... 198/853; 198/845; 474/207; 384/907.1
(58) Field of Classification Search ........... 198/853, 198/845, 851, 852, 687, 838; 474/207; 384/907, 384/907.1
  See application file for complete search history.

(56) References Cited

U.S. PATENT DOCUMENTS

| | | | |
|---|---|---|---|
| 2,600,174 A | 6/1952 | Sheehan | |
| 4,150,584 A | 4/1979 | Theijsmeijer | |
| 4,265,134 A * | 5/1981 | Dupoyet | 474/231 |
| 4,268,243 A * | 5/1981 | Koshkin et al. | 425/575 |
| 4,615,171 A * | 10/1986 | Burk | 59/78 |
| 4,796,749 A | 1/1989 | Lefferts | |
| 5,284,394 A | 2/1994 | Lemelson | |
| 5,412,934 A * | 5/1995 | Furuyama | 59/78 |
| 5,437,148 A * | 8/1995 | Karp | 59/78 |
| 5,593,234 A * | 1/1997 | Liston | 384/492 |
| 5,865,021 A * | 2/1999 | Duerigen et al. | 59/4 |
| 6,250,457 B1 | 6/2001 | Spurck et al. | |
| 6,352,366 B1 | 3/2002 | Schneeberger et al. | |
| 6,517,249 B1 * | 2/2003 | Doll | 384/492 |
| 6,655,845 B1 * | 12/2003 | Pope et al. | 384/492 |
| 6,666,013 B1 * | 12/2003 | Nakagawa et al. | 59/5 |
| 6,666,328 B1 * | 12/2003 | Sykora | 198/853 |
| 6,991,094 B1 * | 1/2006 | Frost | 198/853 |

FOREIGN PATENT DOCUMENTS

| | | |
|---|---|---|
| GB | 1029341 | 5/1966 |
| WO | WO 99/14512 | 3/1999 |

* cited by examiner

*Primary Examiner*—Douglas Hess
(74) *Attorney, Agent, or Firm*—Warner Norcross & Judd

(57) ABSTRACT

A chain conveyor assembly having the combination of a polymeric material and a hard diamond-like coating at the frictional interface of the chain links. The conveyor chain preferably includes male and female links connected to one another by connector pins. The shaft of each connector pin is coated with a diamond-like coating having high hardness, low friction and low wear characteristics. Opposite ends of the connector pins are connected to the female link while the shaft of the connector pin passes through the male link. A polymeric bushing is fitted to the male link in engagement with the shaft of the connector pin. Accordingly, relative movement between the links occurs at the interface of the DLC connector pin and the polymeric bushing.

16 Claims, 10 Drawing Sheets

LONG WEAR CONVEYOR ASSEMBLY

This is a division of application Ser. No. 10/694,064, filed Oct. 27, 2003 (now abandoned), which is a division of application Ser. No. 09/923,985, filed Aug. 7, 2001 (now U.S. Pat. 6,666,328).

BACKGROUND OF THE INVENTION

This invention relates generally to conveyor systems, and more particularly to chain conveyor assemblies used in manufacturing.

To create efficiency in production, conveyors are often used to provide automated transportation of products between workstations. For example, it is common to suspend parts from a conveyor as they are moved through a paint booth and/or assembly workstation. The conveyor permits the parts to be carried at a constant rate, allowing even application of paint. Conveyors can operate for long periods of time, eliminating the need for transportation manpower and the possibility of human error in manual transport.

A common form of these conveyors is the chain conveyor. Chain conveyor assemblies generally include a chain that is driven around a facility by a motor. Hangers or other similar structures can be attached to the chain so that parts can be easily attached and removed. A conventional chain conveyor typically includes a number of male and female links that are interconnected one after another to form the full length of the chain.

A result of the prolonged use of conveyors is deterioration, caused by the friction between interfacing parts. This deterioration can occur in numerous places. For instance, in chain conveyors there is a relatively high amount of friction induced deterioration at the point of interface between the male and female chain links. Over time the material starts to erode, causing the chain to stretch and eventually requiring an expensive rebuild or replacement of the entire chain.

A common attempt to reduce the deterioration of conveyor parts is through the application of lubricants. By lubricating the conveyor, the friction between parts is reduced and the life of the chain is extended. Many lubricating systems are available that can be attached to or near the chain and programmed to pump a lubricant onto the conveyor at regular intervals. Unfortunately, the lubricant application equipment, and lubricants themselves, are expensive and can cause problems by dripping onto floors and products. For example, lubricant drippings and overspray that fall on a part can interfere with the application of paint and other coatings to the part. Lubricants also entrap and retain dirt and dust that can affect wear and other operational aspects of the conveyor.

Another attempted solution is to case harden the conveyor chain. By hardening the chain, the effects of wear can be significantly reduced. To prevent the wear from being focussed on a single component of the chain, it is typically necessary to harden the entire chain, including the links and the connector pins. The hardening process is rather expensive and, although it extends the life of the chain, wear remains a significant concern even with a hardened chain. In fact, wear remains a significant problem even when hardened chains and lubricants are combined.

In applications outside of the conveyor industry, wear issues are sometimes addressed by applying an extremely hard, carbon film coating to the metal parts that are most heavily affected by deterioration. These coatings are often referred to as diamond-like coatings or "DLCs." DLCs can be applied by a variety of techniques, such as ion-beam deposition, sputtering, chemical vapor deposition and the like. Although DLCs are extremely hard, they are also extremely thin. As a result, DLCs are somewhat fragile and quickly deteriorate in high load applications, such as industrial conveyor applications. Consequently, the use of DLC in the industrial conveyor industry has long been considered impractical and infeasible.

SUMMARY OF THE INVENTION

The aforementioned problems are overcome by the present invention wherein a conveyor assembly is provided with a chain in which the interface of adjacent links includes the combination of a DLC and a polymeric bushing. The combination is disposed at locations of relative movement between adjacent links so that relative movement between the links occurs between the coated part and the bushing.

In a preferred embodiment, the chain includes male and female links that are interconnected to each other by connector pins. The connector pins are fixed with respect to the female links. The male links are pivotally mounted about the connector pins to provide the chain with flexibility. The DLC is disposed on the outer surface of the connector pin and the bushing is fixed to the male link in interfacing relationship with the DLC coated pin.

In a more preferred embodiment, each male link includes a recess adapted to receive the bushing. The recess is shaped to not only receive, but also to secure the bushing, preventing its rotational movement with respect to the male link.

In another aspect, the present invention is incorporated into a bearing assembly, such as the ball bearing assembly supporting the conveyor chain. In a preferred embodiment, the bearing assembly includes bearings that are coated with a DLC and a raceway assembly that includes polymeric bushings to contact the bearings. Alternatively, the raceways can be manufactured entirely from a polymeric material, eliminating the need for separate bushings.

The present invention provides a simple and effective assembly that reduces wear and dramatically increases the life of high-wear components. The present invention also eliminates the need for conventional lubricating systems. Unlike the conventional use of lubricants and very hard, smooth surfaces to reduce friction between chain links, the present invention achieves improved results by eliminating conventional lubricants and combining the smooth, very hard DLC surface with a softer polymeric bushing at the interface of adjacent moving parts. Further, when necessary, the chain can be refurbished by the replacement of inexpensive bushings as opposed to replacement of the entire chain. The present invention also provides significant advantages in noise reduction.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
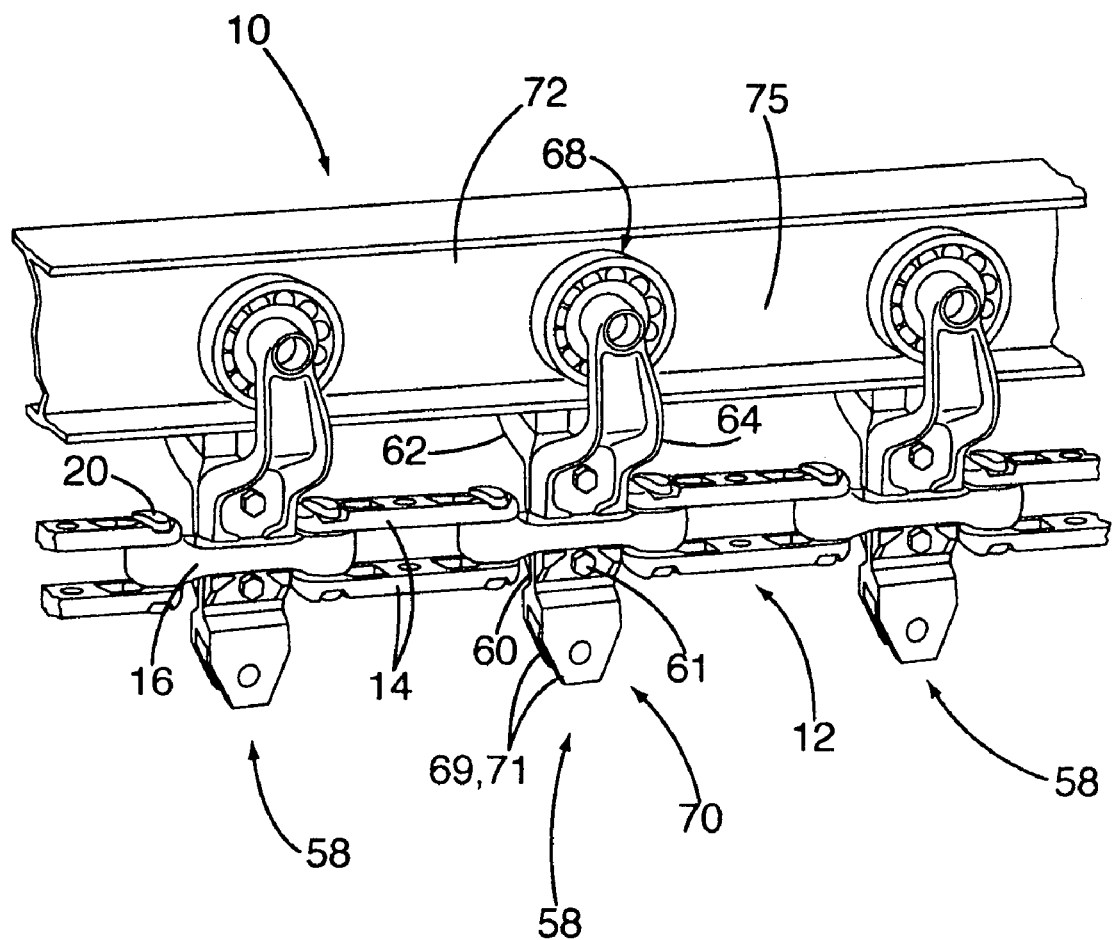
FIG. 1 is a perspective view of a chain conveyor.

A chain conveyor assembly in accordance with a preferred embodiment of the present invention is shown in FIG. 1, and generally designated 10. The chain conveyor 10 is configured to transport parts to and/or through various workstations. In general, the chain conveyor assembly 10 includes a chain 12 suspended from a support structure, such as monorail 72. The chain 12 includes a plurality of trolleys 58 that suspend the chain 12 from the monorail 72 and carry the parts (not shown). The chain 12 further includes a plurality of female links 14, and male links 16 that are joined together by connector pins 20. The connector pins 20 are coated with a diamond-like coating ("DLC"). A polymeric bushing 18 is fitted for rotation about each connector pin 20 (See FIGS. 2 and 3). The combination of the DLC pins 20 and the polymeric bushings 18 reduces wear and dramatically increases the life of the chain 12. Although the present invention is described primarily in connection with a monorail suspended chain conveyor having a chain and trolley assembly, the present invention is well suited for use in a wide variety of other applications, including other chain conveyor applications.

As perhaps best shown in FIG. 1, the chain conveyor assembly 10 includes monorail 72 that defines a track for movement of the chain 12. The monorail 72 is generally conventional and therefore will not be described in detail. Suffice it to say that the monorail 72 is generally "I"-shaped in cross-section and is mounted to an appropriate support structure (not shown) using conventional techniques and apparatus. Although not shown, the chain conveyor assembly 10 also includes a conventional drive assembly that moves the chain along the monorail 72 providing automated movement of parts along the conveyor assembly 10.

As noted above, the chain 12 is suspended from the monorail 72 by a plurality of trolleys 58. The trolleys 58 are generally conventional and therefore will not be described in great detail. A single trolley is mounted to and extends through each male link 16, as described in more detail below. Referring to FIG. 1, each trolley 58 is generally "Y"-shaped and includes a pair of arms 62 and 64 that are connected to a body 60, for example, by bolts 61. The arms 62 and 64 extend upwardly and wrap around opposite sides of the monorail 72 terminating in the voids 73 and 75 defined on opposite sides thereof. The arms 62 and 64 are mounted to bearing assemblies 68, which ride along the monorail in voids 73 and 75. The body 60 is a vertically extending plate that extends through the void 74 (See FIGS. 2 and 4) in the corresponding male link 16. A pair of contoured plates 69 and 71 are mounted to the lower end of each body 60 below the corresponding male link 16 to define a clevis 70. The clevis 70 provides a structure from which to suspend the parts (not shown) that are conveyed by the chain conveyor assembly 10. The clevis 70 is wider than the void 74, thereby retaining the male link 16, and consequently the chain 12, on the trolleys 58.

Figure 2:
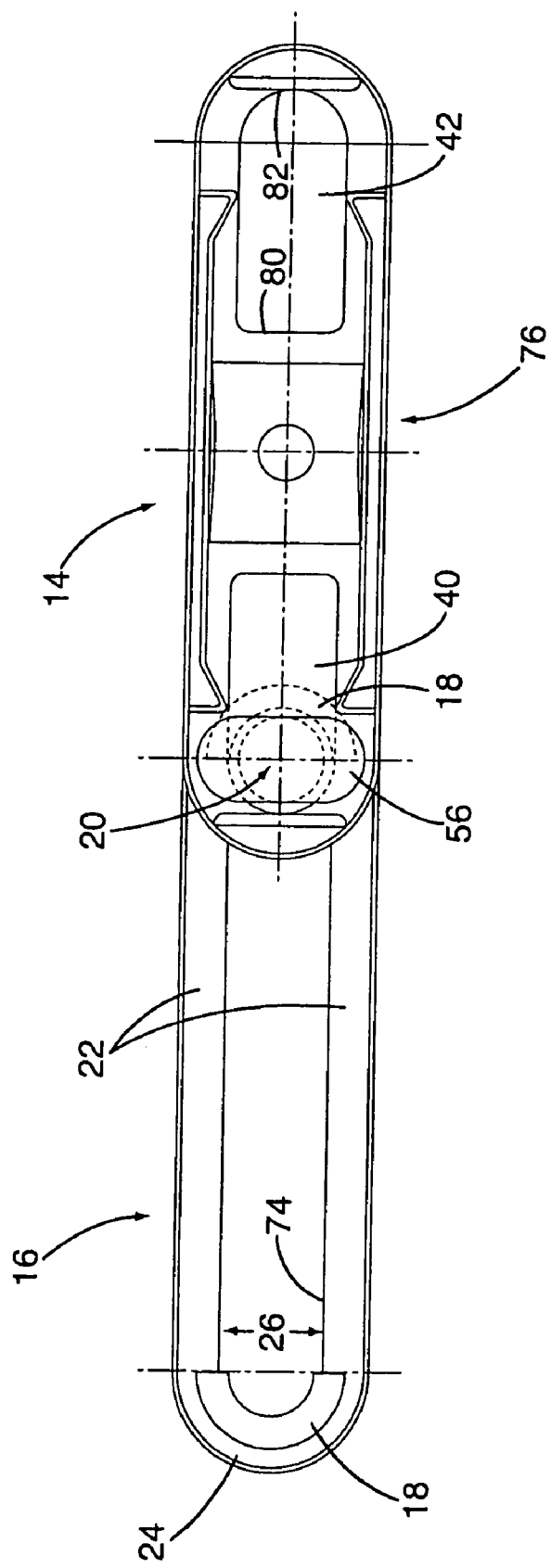
FIG. 2 is a top plan view of a section of the chain showing a male chain link, a female chain link and a connector pin.
Figure 4:
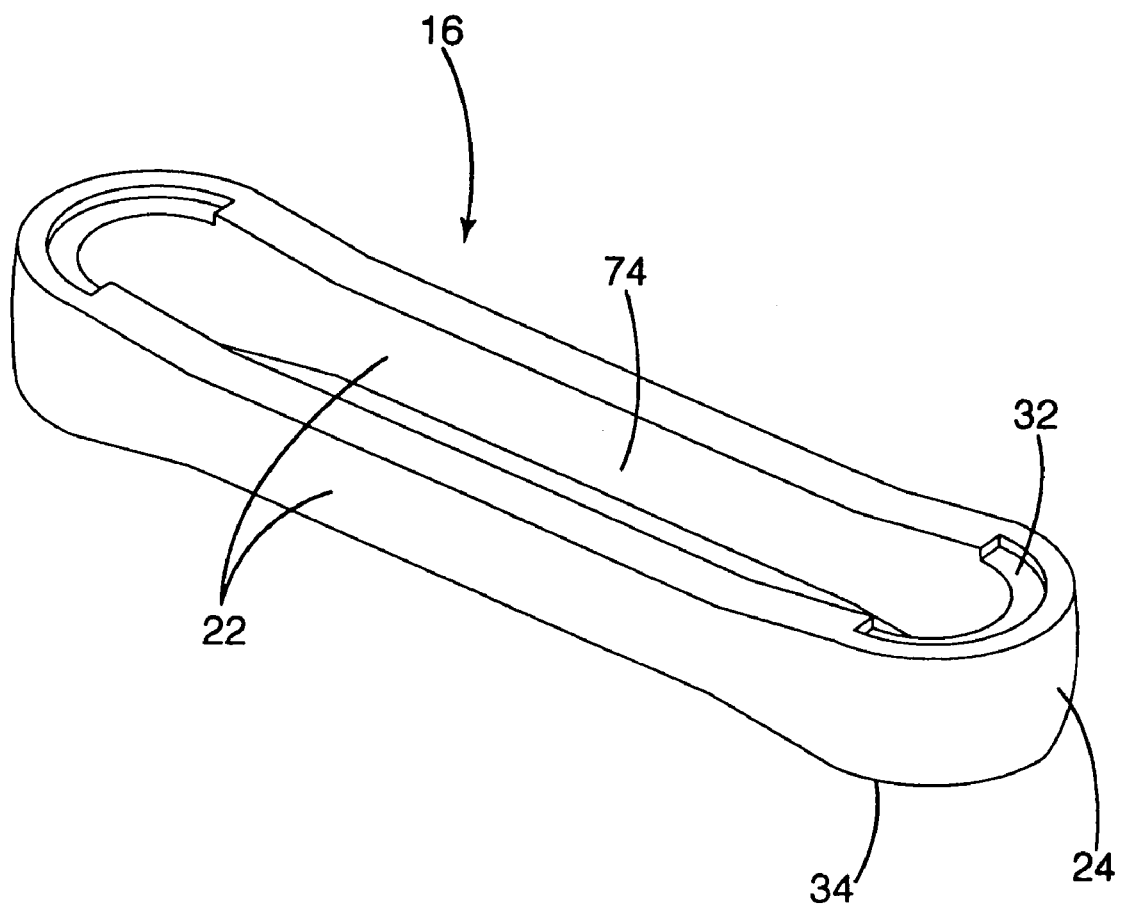
FIG. 4 is a perspective view of a male link.

As noted above, the chain 12 includes a plurality of interconnected male 16 and female 14 links. Referring now to FIG. 2, each male link 16 is generally annular defining a central void 74. Each male link 16 includes a pair of parallel sidebars 22 joined together by opposing male link arcs 24. Each male link arc 24 includes an inner diameter 26 that is slightly larger than the outer diameter of the bushing 18. FIG. 4 shows how each male link arc 24 defines a C-shaped recess 32 and 34 in each of its upper surface 32 and lower surface 34. The recesses 32 and 34 are shaped to receive the end sections 36 of the corresponding bushing 18 (See FIGS. 6–8), thereby providing a substantially flush alignment between the bushing 18 and the male link 16. The sidebars 22 are substantially thinner than the male link arcs 24 to facilitate assembly of the chain 12 in a conventional manner.

Figure 6:
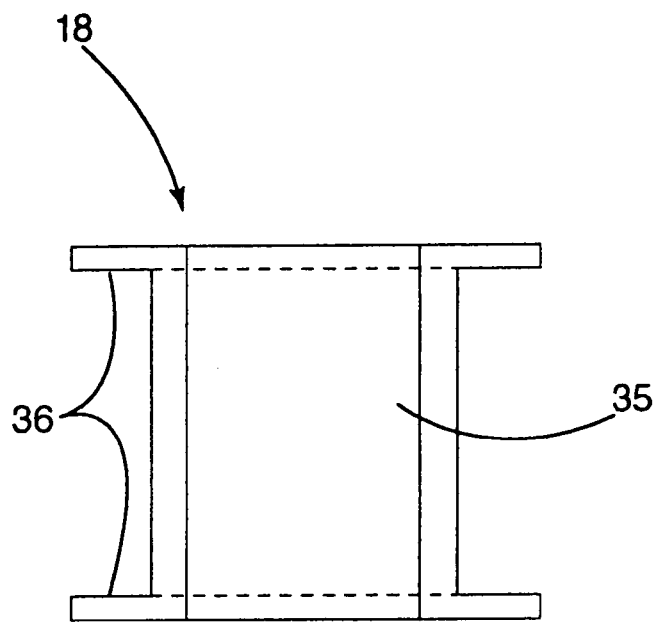
FIG. 6 rear plan view of a polymeric bushing.
Figure 7:
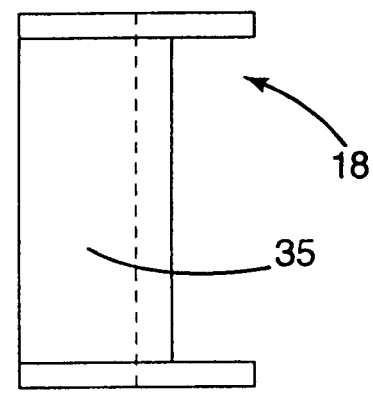
FIG. 7 is a right side elevational view of the polymeric bushing.
Figure 8:
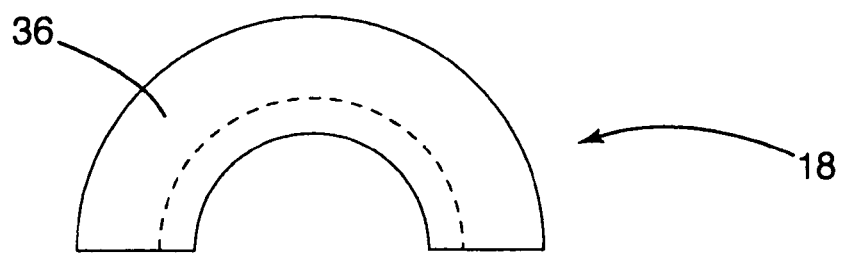
FIG. 8 top plan view of the polymeric bushing.

As shown in FIG. 1, each male link 16 interconnects a pair of female links 14. The male 16 and female links 14 are connected by pins 20 extending through opposite ends of the void 74 in the male link 16. A pair of bushings 18 are fitted to the male link 16 to line the area of contact between the connector pins 20 and the male link 16. Referring now to FIGS. 6, 7, and 8, each bushing 18 is generally C-shaped in cross section and includes a central section 35 and two end sections 36 that correspond in shape to the C-shaped recesses 32 and 34 in the male links 16. Separate bushings 18 are frictionally fitted onto the male link arcs 24 at opposite ends of void 74. The end sections 36 are fitted within the corresponding recesses 32 and 34. The overall height of the bushings 18 is substantially equal to the overall height of the male link arcs 24. The bushings 18 are manufactured from a polymeric material using conventional techniques and apparatus. The polymeric material is preferably a nylon. Even more preferably, the bushings 18 are manufactured from a cast nylon containing finely divided particles of molybdenum disulphide (or other lubricants), such as Nylatron® GSM available from GE Polymerland of Huntersville, N.C. This material is preferred for its low-friction and high load bearing capabilities, as well as its impact resistance.

Figure 3:
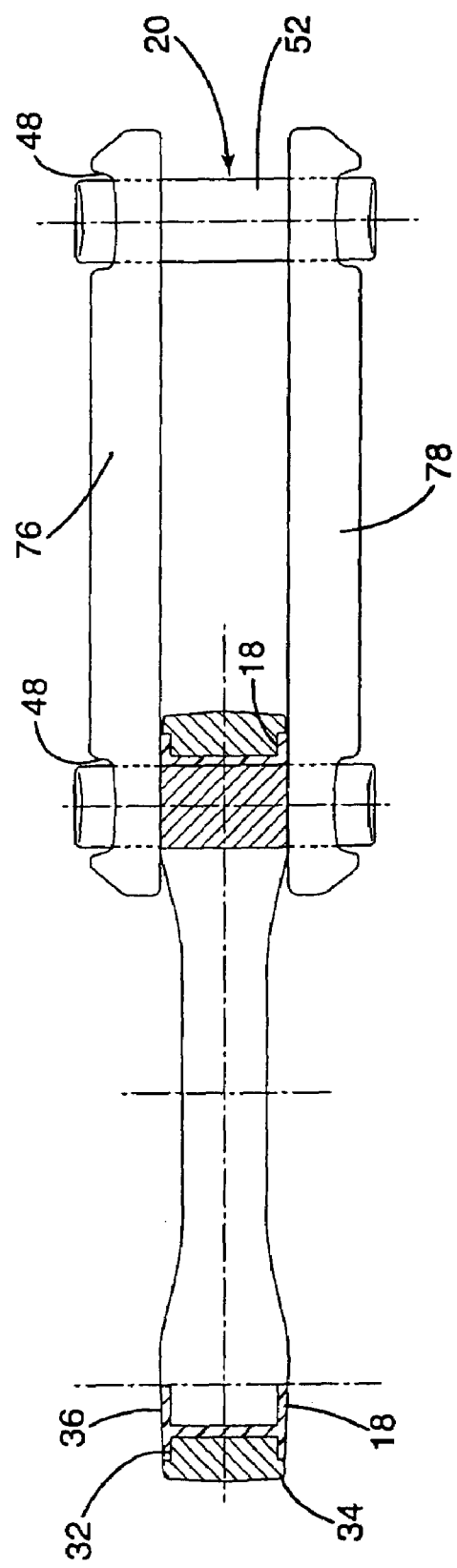
FIG. 3 is a side plan view of a section of the chain showing the male chain link, the female chain link and the connector pin.

As perhaps best shown in FIG. 3, the female link 14 includes top 76 and bottom 78 plates that support a pair of connector pins 20. The top 76 and bottom 78 plates are essentially the mirror image of one another. Accordingly, only the top plate 76 will be described in detail—it being understood that the bottom plate 78 is the mirror image thereof. Shown in FIG. 2, the top plate 76 is a longitudinally extended plate defining a pair of pin openings 40 and 42 disposed toward opposite ends thereof. Each pin opening 40 and 42 is of sufficient size to permit passage of the pin head during assembly of the chain 12, as described in more detail below. Each pin opening 40 and 42 includes a linear inner edge 80 and an arcuate outer edge 82. The diameter of the arcuate outer edge 82 corresponds to the outer diameter of the connector pins 20. Shown in FIG. 3, the top plate 76 includes a pin locking recess 48 extending transversely across the plate 76 at each of the pin openings 40 and 42. The pin locking recesses 48 correspond in shape to the pin head, and are adapted to preclude rotation of the pin 20 with respect to the female link 14 in the assembled chain 12.

Figure 5:
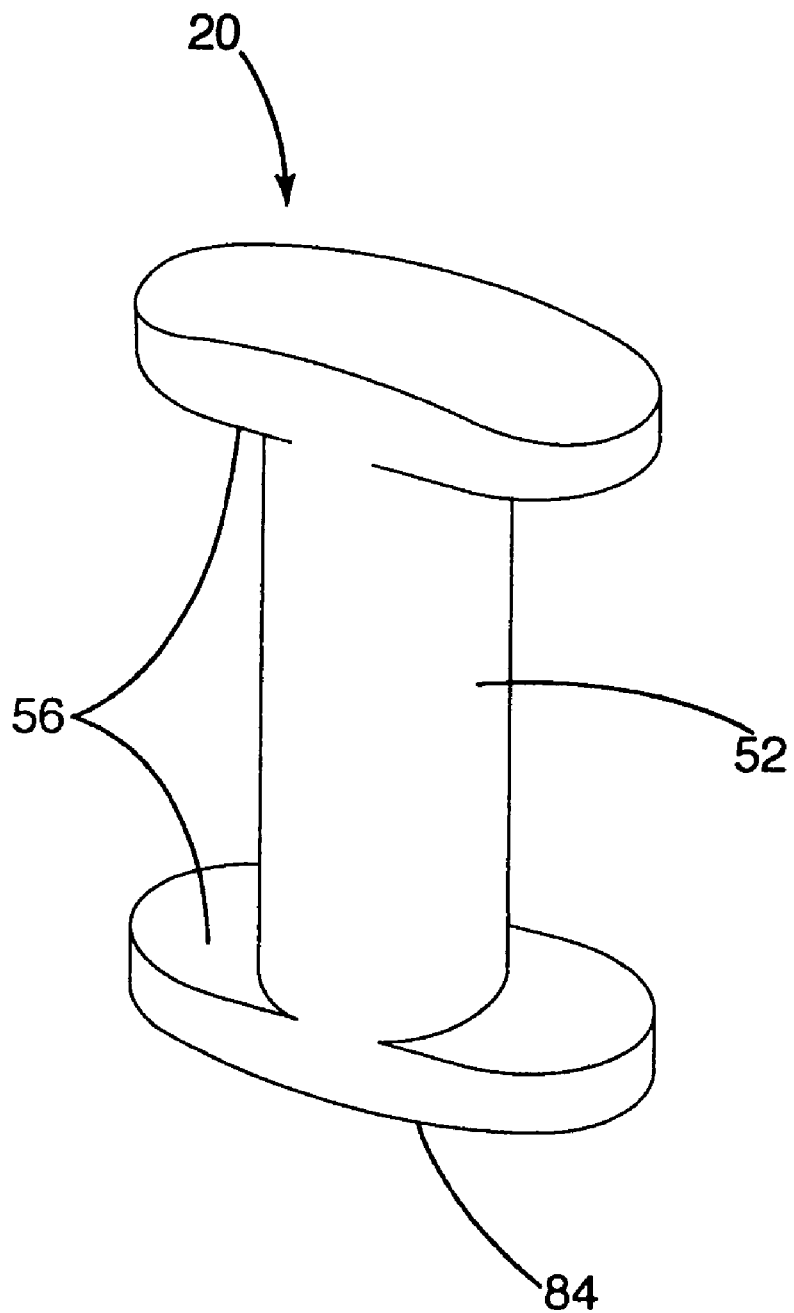
FIG. 5 is a perspective view of a connector pin.

As discussed above, the links are interconnected by connector pins 20. The connector pins 20 are generally identical, and each generally include a shaft 52 having pin heads 56 disposed on opposite ends thereof. As noted above, the connector pin heads 56 are configured to interfit with the recesses 48 in the top 76 and bottom plates 78 of the female links 14. The pin heads 56 are not fully round, but instead include linear edges 84 (See FIG. 5) spaced apart approximately the width of the recesses 48. The outer diameter of the shaft 52 corresponds to the inner diameter of the bushings 18 and the diameter of inner edge 82. The shaft 52 of each pin 20 includes a diamond-like coating (DLC). As used herein, the term "diamond-like coating" or "DLC" refers to a thin, carbon film coating having high hardness, low friction and low wear characteristics. A wide variety of DLCs are well-known and readily available in the industry, including various DLCs available from Front Edge Technology Inc. of Baldwin Park, Calif. In a preferred embodiment, the connector pins 20 are coating with a near-frictionless carbon coating developed and offered by Argonne Laboratory of Argonne, Ill. under the tradename NFC. This thin, carbon film has diamond-like hardness characteristics coupled with ultra-low friction characteristics. DLCs can be disposed on a surface by numerous methods conventional to those skilled in the art, including ion-beam deposition, sputtering and chemical vapor deposition.

When assembled, the chain 12 is comprised of a plurality of alternating male links 16 and female links 14, joined by connector pins 20, as shown in FIG. 1. Each male link arc 24 is fitted with a bushing 18 such that the C-shaped ends 36 of the bushing 18 fit flush into the C-shaped cutouts 32 and 34 in the male link arc 24. The fit of the bushing 18 into the male link 16 prevents any movement of the bushing 18 with respect to the male link 16, and therefore prevents wear between the bushing 18 and the male link 16. The connector pins 20 are fitted into the male link arcs 24, such that the shafts 52 of the pins 20 engage the inner surfaces of the bushings 18. Because the pin heads 56 are interfitted with the recesses 48 in the top 76 and bottom 78 plates, rotational movement of the pin 20 with respect to the female link 14 is precluded. Accordingly, as the chain 12 bends, all movement occurs between the connector pins 20 and the bushings 18.

The above is a preferred embodiment of the present invention as incorporated into a chain conveyor assembly. The use of a combination of DLCs and polymeric bushings can be used in alternative arrangements to achieve the same long wear results achieved in the above described embodiment. For example, in an alternative embodiment of the chain and trolley assembly of the above described embodiment (not shown), the connector pin is fitted with a polymeric bushing and a DLC is disposed on the inner surface of male link arc, with the coating and bushing interfacing to achieve the same low friction, low wear results. In some applications, it may also be possible to form one of the interfacing members entirely of a polymeric material, rather than using a polymeric bushing.

Figure 9:
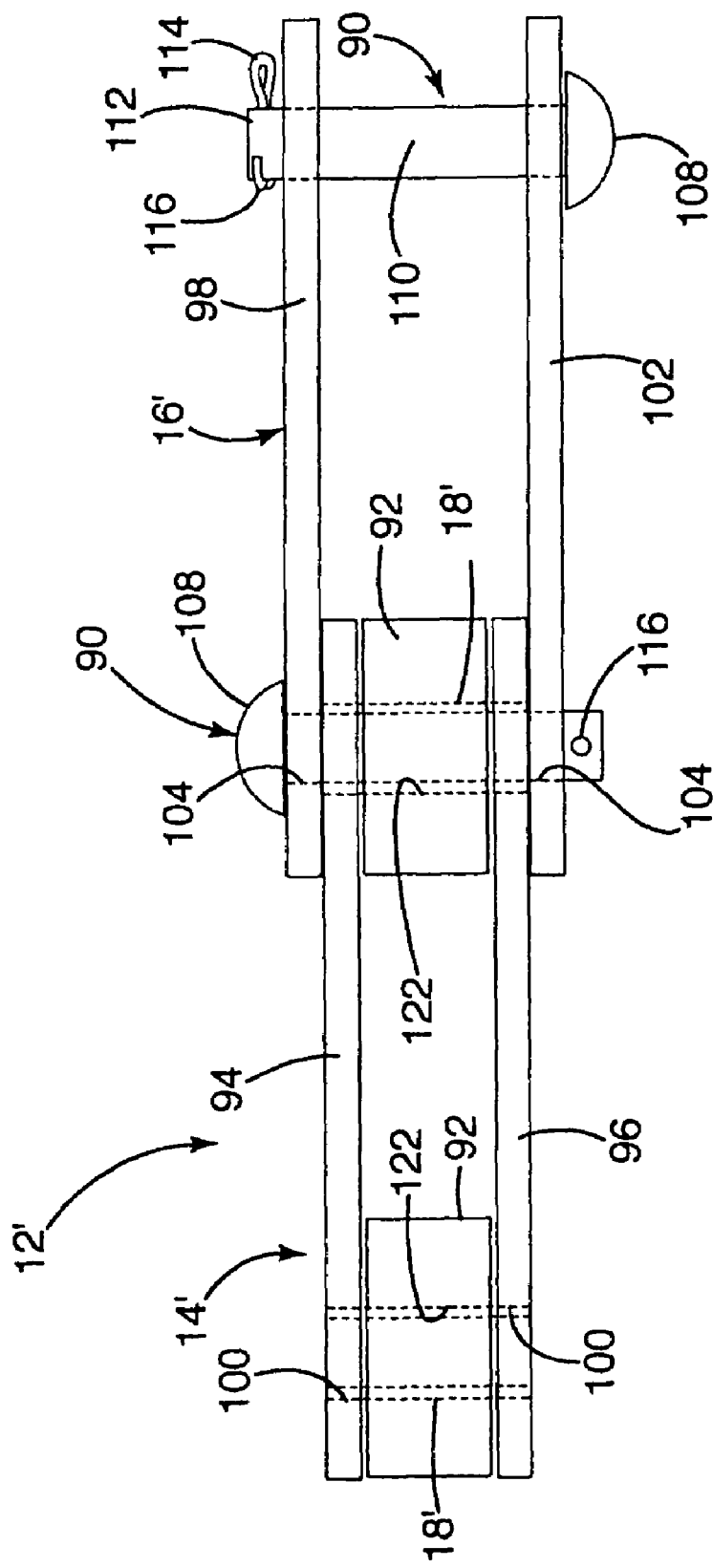
FIG. 9 is a top plan view of a section of a chain for a roller chain conveyor.
Figure 10:
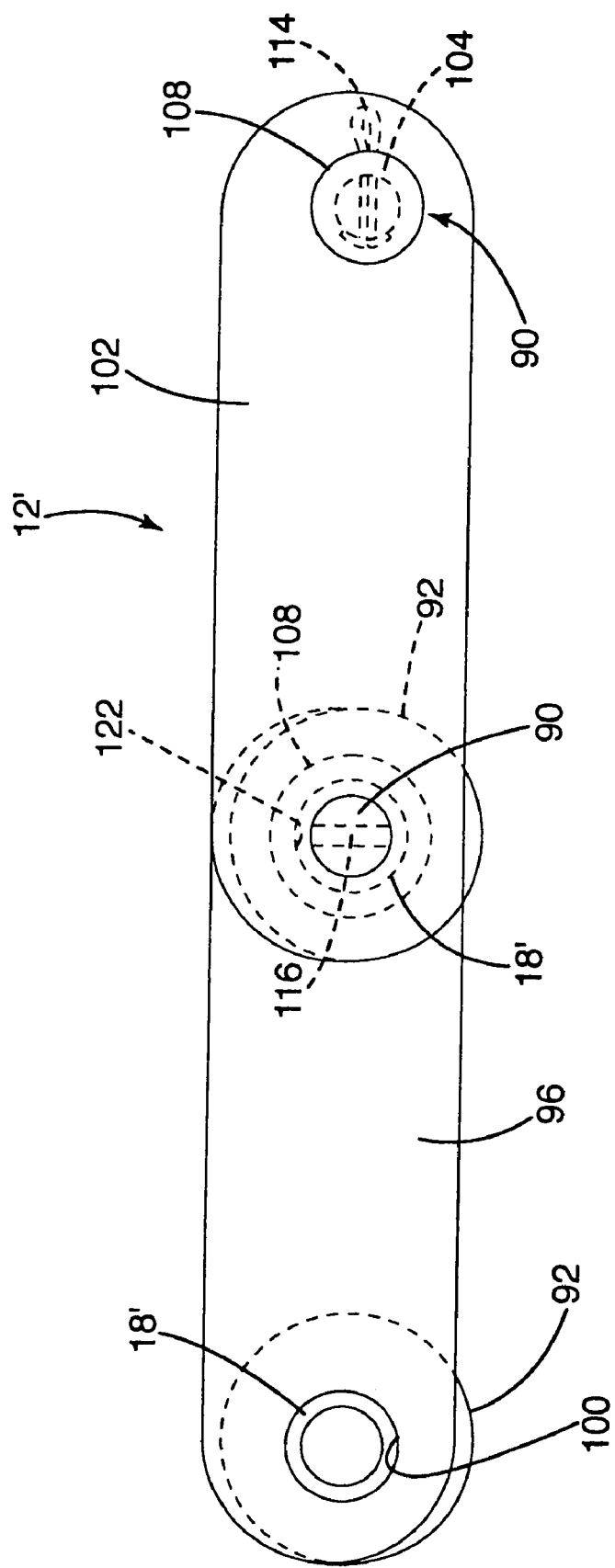
FIG. 10 is a side plan view of section of the roller chain.

An alternative embodiment of the present invention intended for use in an alternative chain conveyor is shown in FIGS. 9 and 10. FIGS. 9 and 10 show a section of a chain from a roller chain conveyor. As shown, the roller chain 12' generally includes male 14' and female 16' links that are interconnected by pins 90. The outer surface of the pin 90 is coated with a DLC. A roller 92 with an internal polymeric bushing 18' is fitted over each pin 90. The bushings 18' rides on the corresponding pins 90 to provide a long wear interface. In use, the roller chain 12' is installed within a conventional conveyor channel (not shown) and is driven by a conventional drive assembly (not shown). The chain 12' is seated in the channel upon the rollers 92, which roll along the floor of the channel to facilitate movement of the chain 12' through the channel.

The male link 14' includes a pair of spaced plates 94 and 96. Each plate 94 and 96 defines a pair of connector openings 100. In the described embodiment, the openings 100 are of sufficient diameter to rotatably receive the bushing 18'. Separate rollers 92 are fitted between the plates 94 and 96 in alignment with the connector openings 100. The rollers 92 are shown in FIG. 10 and each defines an internal cylindrical void 122. In a preferred embodiment, the rollers 92 are manufactured from metal, and more particularly steel. In the described embodiment, each roller 92 is fitted with a polymeric roller bushing 18'. The roller bushing 18' is generally tubular having an outer diameter substantially equal to the inner diameter of the rollers 92 and an inner diameter slightly greater than the outer diameter of the pins 90. In a preferred embodiment, the length of the bushing 14 is generally greater than the length of the rollers 92. More specifically, the bushing 18' is of sufficient length to extend through the rollers 92 and the male link plates 94 and 96 terminating in flush relationship with the outer surfaces of the plates 94 and 96.

Like the male link 14', the female link 16' includes a pair of spaced plates 98 and 102. The plates 98 and 102 each define a pair of connector openings 104. In the described embodiment, the openings 104 of both plates 98 and 102 are of sufficient diameter to permit the pins 90 to pass freely therethrough. The connecting pins 90 generally includes a head 108, a shaft 110 and an end 112. A cotter pin hole 116 is defined in the end 112 of each pin 90. In a preferred embodiment, the connecting pins 90 are of sufficient length to extend entirely through the male 14' and female 16' links with the end 112 protruding from the links to expose cotter pin hole 116. A cotter pin 114 is installed within the cotter pin hole 116 to secure the pin 90 in place. The pin 90 can alternatively be configured with cotter pin holes at opposite ends. In this alternative, the head 108 is eliminated and cotter pins are used to secure both ends of the pin. If desired, the pins 90 can be keyed or otherwise configured to prevent rotation of the pins 90 within the links. The shaft 110 of each pin 90 is coated with a DLC. As with the previously described embodiment, the preferred DLC is a near-frictionless carbon coating available from Argonne Labs under the tradename NFC. When assembled, the pins 90 extend through the bushings 18', thereby providing a long-wear interface between the rollers and the pins 90. Further, the bushing 18' extends into the openings 100 in the plates 94 and 96 of the male link 14'. If desired, the internal surfaces of the openings 100 can be coated with a DLC, for example, the same DLC applied to the pins 90. This provides a long-wear interface between the male 14' and female 16' links.

As noted above, the present invention is not limited strictly to use in conveyor chain applications. For example, the present invention is well suited for use in bearing applications, such as the ball bearings supporting the chain and trolley assembly from the monorail 74 of the first described embodiment. Like conveyor chains, there is a problem of wear and deterioration in bearing assemblies due to the friction between bearings and their raceways. FIG. 8 shows a bearing assembly 200 in accordance with a preferred embodiment of the present invention. Although the present invention is described in connection with a ball bearing 200, it is well-suited for use in other bearing applications, such as roller bearings, ball thrust bearings, roller thrust bearings and tapered roller bearings.

Figure 11:
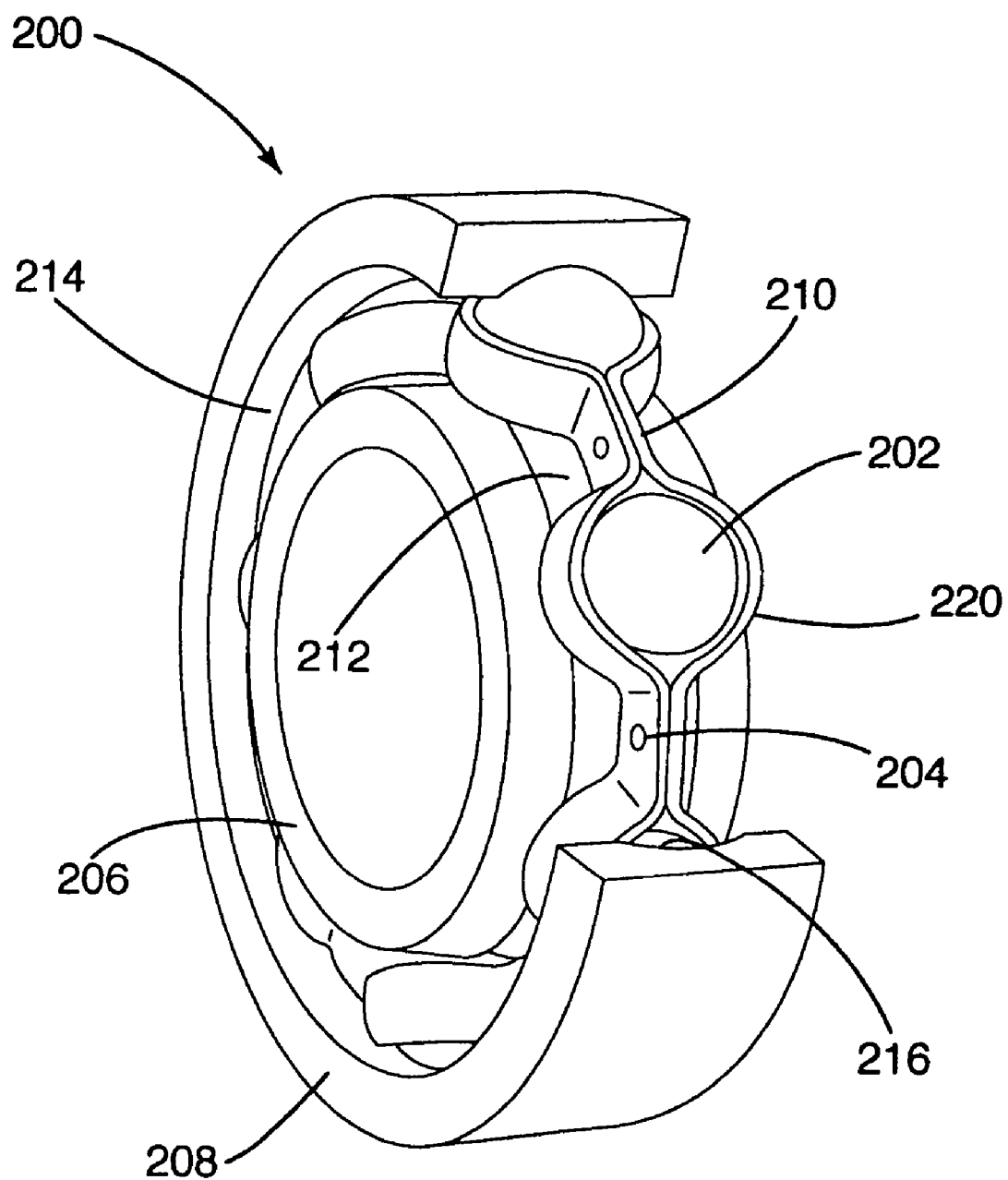
FIG. 11 is a perspective view of a bearing assembly with portions cut away.

As shown in FIG. 11, the bearing assembly 200 generally includes an inner ring 206, an outer ring 208 and a plurality of balls 202 disposed between the inner ring 206 and outer ring 208. In use, the inner ring 206 and outer ring 208 rotate with respect to one another along the balls 202. The inner ring 206 is an annular component having an inner diameter adapted to be fitted over the desired shaft of other components. The inner ring 206 includes an outer circumferential surface 210 that defines an inner raceway 212. The inner raceway 212 extends entirely around the circumference of the inner ring 206 and provides a path in which the balls 202 ride. The outer ring 208 is likewise an annular component. The outer ring 208 is fitted around the outside of the inner ring 206. The outer ring 208 includes an inner circumferential surface 214 that defines an outer raceway 216. The outer raceway 216 extends entirely around the inner circumference of the outer ring 208 and provides a path in which the roller bearings 202 ride.

Figure 12:
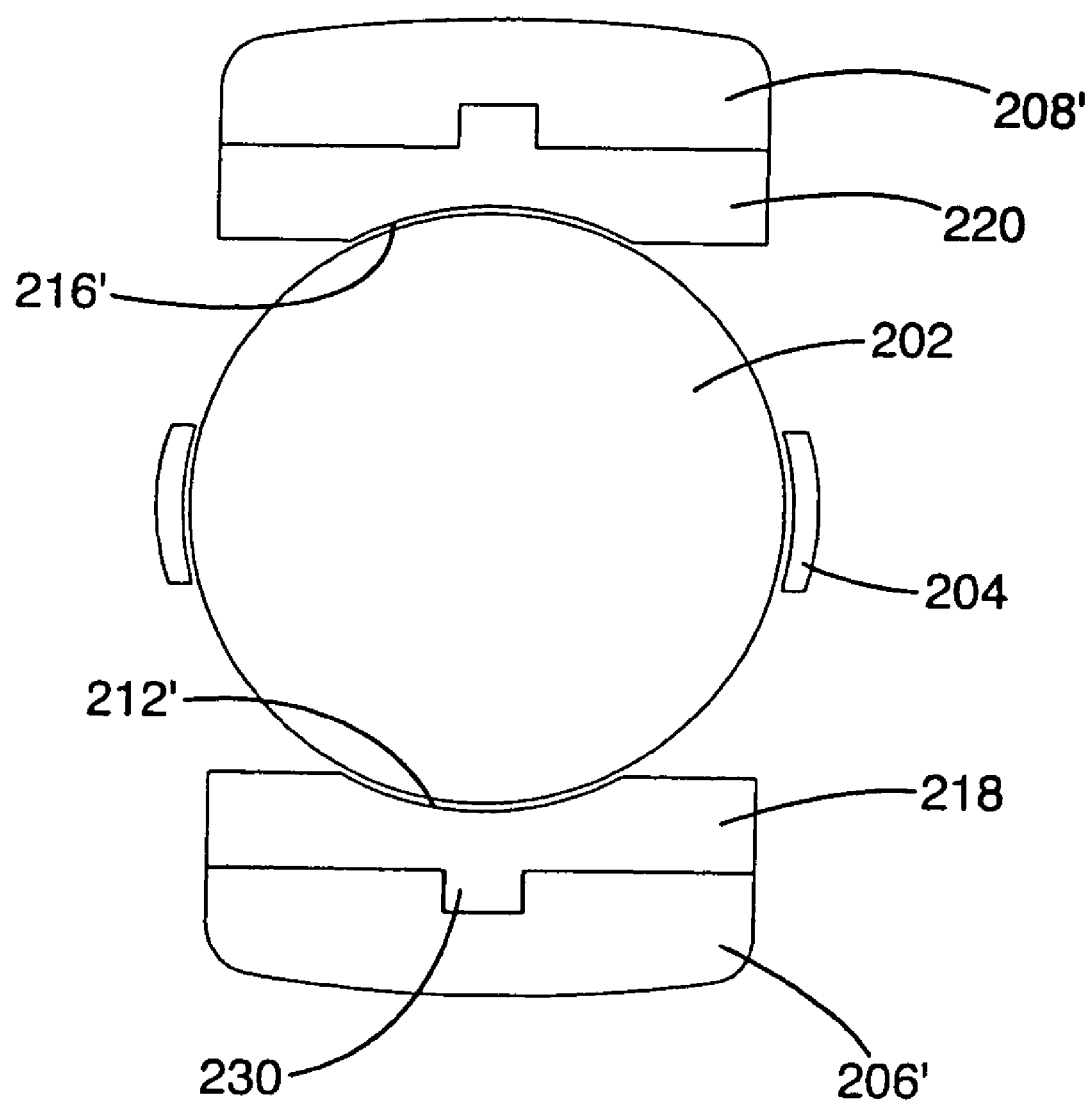
FIG. 12 is a cross-sectional view of a portion of an alternative bearing assembly.

In a preferred embodiment, the inner ring 206 and the outer ring 208 are both manufactured from a soft, polymeric material of the type discussed above in connection with the bushing 18 of the preferred embodiment, such as Nylatron®. Alternatively, the inner 206 and/or outer 208 rings can be manufactured from any desired (and adequate material, such as stainless steel) and include a polymeric ring-shaped bushing (not shown) that is secured to the inner and/or outer raceway (as the case may be) to provide a polymeric surface engaging the DLC bearings 202. With this alternative shown in FIG. 12, the inner ring 206' and outer ring 208' include bushings 218 and 220. The bushings 218 and 220 define the inner 212' and/or outer 216' raceways. The bushings 218 and 220 may be provided with a retaining rib 230 for snap-fitting the bushings into place in the corresponding ring 206' and 208'.

Once assembled, the inner raceway 212 of the inner ring 206 and the outer raceway 216 of the outer ring 208 cooperate to entrap the balls 202. The balls 202 are fitted within a conventional spacer 204 that maintains the balls 202 in spaced relationship around the raceways. The spacer 204, shown in FIG. 11, is generally ring-shaped and is fitted between the inner 206 and outer 208 rings. The spacer 204 defines a plurality of smaller, ball seats 220 that are evenly spaced around the circumference of the spacer 204. The ball seats 220 each surround a single ball 202, holding it in place with respect to the other balls 202 but still allowing it to rotate with respect to the inner 206 and outer 208 rings. The ball bearings 202 are coated with a DLC, such as one of those described above in connection with the preferred embodiment, so that the interface between the raceways and the balls becomes a long wear interface between a soft polymeric material and a DLC. In alternative embodiment (not illustrated), the balls 202 can be manufactured from a polymeric material and the raceways can be coated with a DLC.

Although the present invention is described primarily in connection with various chain conveyor applications, the present invention is well-suited for use in a variety of applications where it is desirable to reduce wear. For example, the present invention is readily incorporated into the tracks of track vehicles, such as tractors, bulldozers and the like. In such applications, the conventional interfacing components are modified to include a first component having a DLC and a second coating having a polymeric bushing (or being manufactured entirely from a polymeric material).

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A chain for a roller chain conveyor comprising:
   a male link;
   a female link mounted to said male link by a connector member, said connector member including a shaft, said shaft being coated with a diamond-like coating;
   a roller rotatably mounted to said connector member with said male link and said female link; and
   a polymeric bushing fitted within said roller, said bushing surrounding said shaft, such that said coating directly interfaces with said bushing.

2. The chain of claim 1 wherein said bushing includes an end portion protruding axially from said roller, said male link including a plate defining a void fitted over said end portion of said bushing.

3. The chain of claim 2 wherein said diamond-like coating is a thin, carbon film coating.

4. The chain of claim 3 wherein said bushing is manufactured from a polymeric material containing strength and rigidity enhancing additives.

5. The chain of claim 3 wherein said bushing is manufactured from a nylon containing Molybdenum disulphide.

6. A roller chain for a roller chain conveyor comprising:
   a male link having a surface defining at least one connector opening, said surface being coated with a diamond-like coating;
   a female link interconnected with said male link by a connector member;
   a polymeric bushing fitted about said connector member and extending into said connector opening, such that said coating directly interfaces with said bushing; and
   a roller rotatably mounted to said connector member.

7. The roller chain of claim 6 wherein said connector member is coated with a diamond-like coating, such that said coating on said connector member directly interfaces with said bushing.

8. The roller chain of claim 7 wherein said diamond-like coating is a thin, carbon film coating.

9. The roller chain of claim 8 wherein said bushing is manufactured from a polymeric material containing strength and rigidity enhancing additives.

10. The roller chain of claim 8 wherein said bushing is manufactured from a nylon containing Molybdenum disulphide.

11. A roller chain for a roller chain conveyor comprising:
    a male link having a pair of spaced apart plates;
    a female link having a pair of spaced apart plates;
    a connector member interconnecting said female link and said male link, at least a portion of said connector member having a diamond-like coating;
    a roller rotatably mounted over said connector member; and
    a polymeric bushing mounted over said connector member within said roller, such that said roller directly interfaces with said bushing.

12. The roller chain of claim 11 wherein said bushing includes end portions protruding axially from opposite ends of said roller, each of said plates of said male link defining a void fitted over a corresponding one of said end portions of said bushing.

13. The roller chain of claim 12 wherein said diamond-like coating is a thin, carbon film coating.

14. The roller chain of claim 13 wherein said bushing is manufactured from a polymeric material containing strength and rigidity enhancing additives.

15. The roller chain of claim 13 wherein said bushing is manufactured from a nylon containing Molybdenum disulphide.

16. The roller chain of claim 12 wherein said connector member is further defined as a pin having a shaft, at least a portion of said shaft having said diamond-like coating.

* * * * *